Patented Aug. 30, 1932

1,874,322

UNITED STATES PATENT OFFICE

MARTIN LUTHER, OF MANNHEIM, AND WALTER FLEMMING, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

OXIDATION OF ALIPHATIC HYDROCARBONS OF HIGH MOLECULAR WEIGHT

No Drawing. Application filed August 30, 1928, Serial No. 303,104, and in Germany October 6, 1927.

It is already known that hydrocarbons, higher alcohols and the like, in liquid form, can be converted into products consisting mainly of acids by means of gaseous oxidizing agents, at an elevated temperature and in the presence of metallic catalysts. The catalysts hitherto known, however, have the drawback that they usually cause discoloration, and even resinification, of the oxidized products during the process of oxidation.

We have now found that excellent yields of very light colored and highly oxidized products are obtained from aliphatic hydrocarbons of high molecular weight, especially paraffin hydrocarbons, by treatment with a gaseous oxidizing agent, while heating, if the oxidation be performed in the presence of an organic oxygen compound of the base earth metals, i. e. calcium, barium, strontium, magnesium and aluminium, or a mixture thereof. A suitable method of working consists in the employment of such compounds as will dissolve in the hydrocarbons under treatment or the resulting reaction products, for example the stearates, oleates, abietates, anthranilates, cinnamates and the like of the said metals. It has been found particularly advantageous to employ the said catalysts in conjunction with inert fillers, consisting, for example, of aluminium, ceramic materials and the like.

As gaseous oxidizing agents there may be mentioned oxygen or mixtures of gases containing the same or nitrogen oxids or mixtures of these agents.

The temperature employed usually ranges between 80° and 180° C., depending on the nature of the material to be acted upon.

The following examples will further illustrate the nature of the said invention which however is not limited thereto. The parts are by weight.

Example 1

A powerful current of air is blown through 1000 parts of soft paraffin wax in which 1 part of barium stearate is dissolved in the warm, for several hours at 150° C., in a tower filled with aluminium rings. An oxidation product is obtained, which is only slightly tinged with yellow, of the consistency of ointment, and has the acid value 86 and saponification value 236. A distillate is also obtained which consists of readily volatile oxidation products.

Example 2

Air is blown, for several hours at 130° C., in the manner described in Example 1, through 1000 parts of soft paraffin wax in which 1 part of calcium cinnamate has been dissolved in the warm. The resulting oxidation product is white, of the consistency of ointment, and has the acid value 103 and saponification value 230. In the place of the calcium cinnamate the corresponding barium salt can be employed.

What we claim is:—

1. In the process of the destructive oxidation of aliphatic hydrocarbons of high molecular weight in the liquid state by passing a gaseous oxidizing agent through the said compounds while heating, the step which comprises carrying out the reaction in the presence of a small quantity of a salt of an organic acid with a base earth metal selected from the class consisting of calcium, barium, strontium, magnesium and aluminum.

2. In the process of the destructive oxidation of aliphatic hydrocarbons of high molecular weight in the liquid state by passing a gaseous oxidizing agent through the said compounds while heating, the step which comprises carrying out the reaction in the presence of inert filler bodies and of a small quantity of a salt of an organic acid with a base earth metal selected from the class consisting of calcium, barium, strontium, magnesium and aluminum.

3. In the process of the destructive oxidation of aliphatic hydrocarbons of high molecular weight in the liquid state by passing a gaseous oxidizing agent through the said compounds while heating, the step which comprises carrying out the reaction in the presence of a small quantity of a salt of an organic acid with alkaline earth metals.

4. In the process of the destructive oxidation of aliphatic hydrocarbons of high molecular weight in the liquid state by passing a gaseous oxidation agent through the said compounds while heating, the step which comprises carrying out the reaction in the presence of a small quantity of a salt of an organic acid, containing more than 6 carbon atoms in its molecule, with a base earth metal selected from the class consisting of calcium, barium, strontium, magnesium and aluminum.

5. In the process of the destructive oxidation of paraffin wax by passing a current of a gaseous oxidizing agent through the wax heated to a temperature between 100° and 160° C., the step which comprises carrying out the reaction in the presence of a small quantity of a salt of an organic acid, containing more than 6 carbon atoms in its molecule, with a base earth metal selected from the class consisting of calcium, barium, strontium, magnesium and aluminum.

6. In the process of the destructive oxidation of paraffin wax by passing a current of a gaseous oxidizing agent through the wax at a temperature between 100° and 160° C., the step which comprises carrying out the reaction in the presence of a small quantity of a salt of an organic acid containing more than 6 carbon atoms in its molecule with an alkaline earth metal.

7. In the process of oxidizing paraffin wax by passing a current of air at a temperature of about 150° C., through the said wax, the step which comprises carrying out the reaction in the presence of a small quantity of barium cinnamate.

8. In the process of oxidizing paraffin wax by passing a current of air at about 150° C., through the said wax, the step which comprises carrying out the reaction in the presence of a small quantity of an alkaline earth metal stearate.

In testimony whereof we have hereunto set our hands.

MARTIN LUTHER.
WALTER FLEMMING.